United States Patent
Ezrielev et al.

(10) Patent No.: US 12,332,750 B2
(45) Date of Patent: Jun. 17, 2025

(54) CYBER RECOVERY FORENSICS KIT—EFFICIENT EVENT SEARCHING OVER PITS

(71) Applicant: Dell Products L.P., Round Rock, TX (US)

(72) Inventors: Ofir Ezrielev, Beer Sheva (IL); Jehuda Shemer, Kfar Saba (IL); Amihai Savir, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/046,603

(22) Filed: Oct. 14, 2022

(65) Prior Publication Data

US 2024/0126662 A1    Apr. 18, 2024

(51) Int. Cl.
*G06F 16/00* (2019.01)
*G06F 11/14* (2006.01)
*G06F 16/23* (2019.01)

(52) U.S. Cl.
CPC ...... *G06F 11/1469* (2013.01); *G06F 16/2365* (2019.01); *G06F 2201/84* (2013.01)

(58) Field of Classification Search
CPC ............. G06F 11/1469; G06F 16/2365; G06F 2201/84
See application file for complete search history.

(56) References Cited

U.S. PATENT DOCUMENTS

| | | | | |
|---|---|---|---|---|
| 9,804,934 | B1* | 10/2017 | Natanzon | G06F 11/1471 |
| 2011/0106768 | A1* | 5/2011 | Khanzode | G06F 11/1458 |
| | | | | 707/646 |
| 2012/0078855 | A1* | 3/2012 | Beatty | G06F 11/1451 |
| | | | | 707/E17.007 |
| 2012/0310896 | A1* | 12/2012 | Freedman | G06F 11/1469 |
| | | | | 707/E17.007 |
| 2018/0373604 | A1* | 12/2018 | Martin | G06F 11/1451 |
| 2019/0095286 | A1* | 3/2019 | Fang | G06F 11/1464 |
| 2019/0327086 | A1* | 10/2019 | Slowik | H04L 9/3247 |
| 2021/0342246 | A1* | 11/2021 | Schreiber | G06F 11/3428 |
| 2021/0349748 | A1* | 11/2021 | Dunfey | G06F 3/065 |
| 2022/0283901 | A1* | 9/2022 | Yadav | G06F 11/1469 |
| 2023/0385153 | A1* | 11/2023 | George | G06F 11/1435 |

\* cited by examiner

*Primary Examiner* — Dinku W Gebresenbet
(74) *Attorney, Agent, or Firm* — Workman Nydegger

(57) ABSTRACT

A method includes searching a group of PITs, identifying one of the PITs as having an indicator of an occurrence of an event involving data associated with the identified PIT, restoring the data, running a production system copy using the data, and while the production system copy is running, taking increasingly granular backups of the data until the event is located. The event may be a corruption of the data, or other problem.

18 Claims, 4 Drawing Sheets

CYBER RECOVERY FORENSICS KIT—EFFICIENT EVENT SEARCHING OVER PITS

FIELD OF THE INVENTION

Embodiments of the present invention generally relate to the identification and analysis of events of interest in a data storage environment. More particularly, at least some embodiments of the invention relate to systems, hardware, software, computer-readable media, and methods, for efficiently searching backups to locate and identify events of interest.

BACKGROUND

Stored data, such as data residing at a storage site in a data protection environment, may be subject to various attacks, such as malware for example, that may compromise the data and/or make the data inaccessible. However, locating and identifying the source of the problem can be difficult, time consuming, and resource-intensive.

For example, a backup dataset that may contain billions of files may be difficult to search in an effective and timely manner. Moreover, the amount of processing, and other, resources needed to effect the search may be prohibitive.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
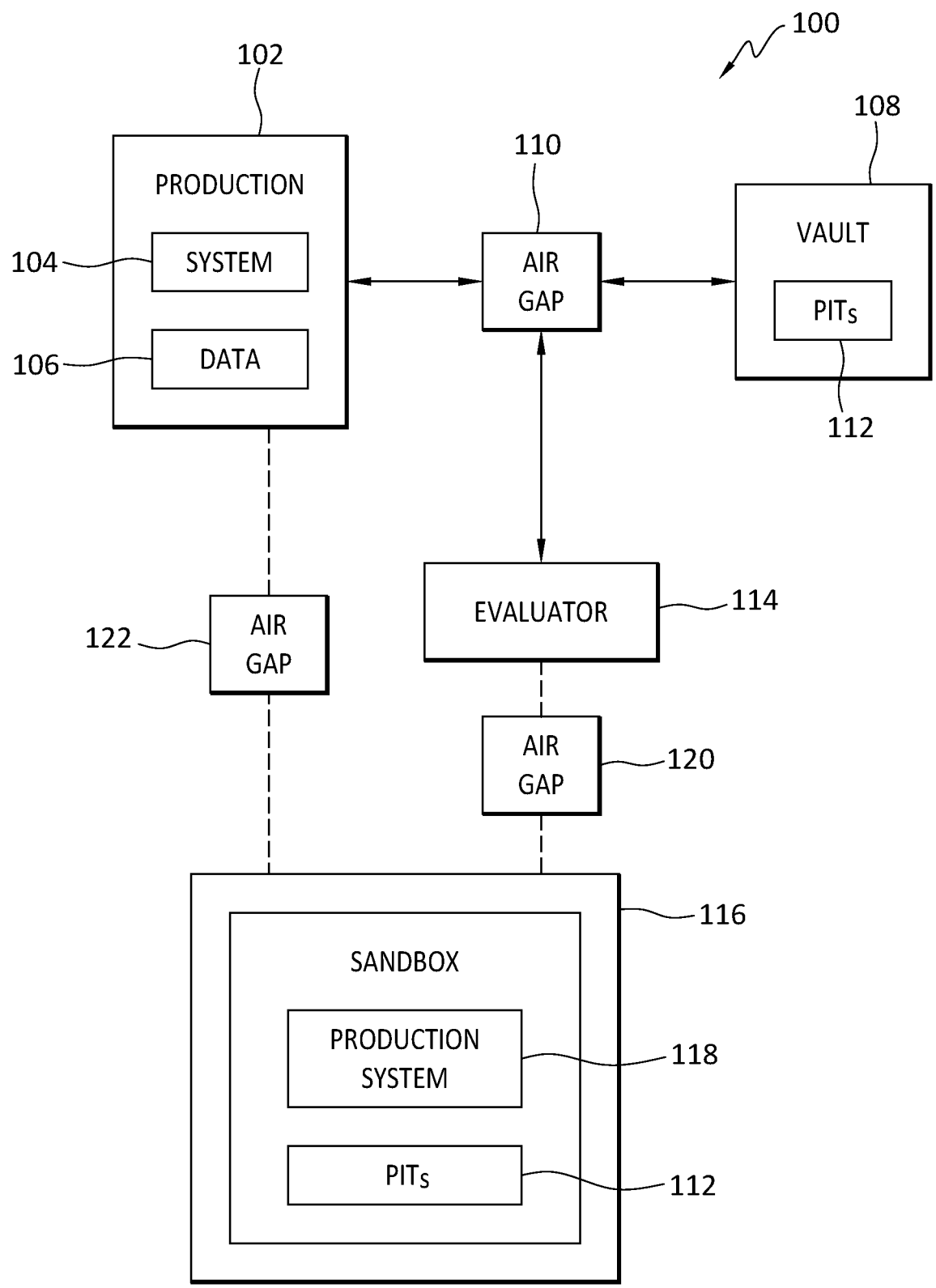
FIG. 1 discloses aspects of an example architecture according to an embodiment.

Embodiments of the present invention generally relate to the identification and analysis of events of interest in a data storage environment. More particularly, at least some embodiments of the invention relate to systems, hardware, software, computer-readable media, and methods, for efficiently searching backups to locate and identify events of interest.

In general, an embodiment of the invention may utilize point in time (PIT) backups and/or snapshots that have been taken of a dataset. For ease of reference, these will individually and collectively be referred to herein simply as 'PIT's. A forensic kit, such as may be employed by law enforcement, auditors, or other personnel, for example, may comprise multiple PITs pertaining to a dataset. In an embodiment, the PITs may enable a user to locate, and identify, within a backup dataset, one or more events of interest. With this information, a user may be able to take various actions including, but not limited to, (1) stopping an ongoing attack, (2) implementing a remedy to an attack that has occurred, and/or, (3) preventing a future attack.

In more detail, an embodiment may comprise performing a search of PITs that have been created for a dataset, and when a problem is identified in one of the PITs, selecting that PIT for evaluation. The selected PIT may then be restored. A copy, such as a digital twin, of a production site may be run in a 'sandbox' using the restored data. The sandbox may be configured so that if the restored data is infected, or otherwise problematic, the infected data, and its cause, cannot be communicated to any entity outside the sandbox. As the production site copy runs using the restored data, backups may be periodically taken of the data, such as one backup every minute for 10 minutes, to attempt to narrow down the window of time during which the problem occurred. If, for example, it is determined that the problem occurred sometime between minute 2 and minute 3, then further backups may be taken, such as every second for example, between minute 2 and minute 3. In this way, the search for the problem may be quickly narrowed down to a small window of time, thus enabling rapid and efficient identification of the time when the problem first started.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one embodiment may enable rapid, and efficient, search of a dataset to determine when a problem affecting the dataset occurred. An embodiment may avoid the need to search an entire dataset when attempting to determine when a problem affecting the dataset occurred. An embodiment may reduce, relative to approaches other than those embraced by this disclosure, the amount of time and resources needed to determine when a problem affecting a dataset occurred. Various other advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, and storage environments such as the Dell PowerProtect Cyber Recovery (CR) system. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM), containerized computing solutions, mobile devices, IoT (Internet of Things) systems and devices, edge devices and systems, and any other systems and devices, which may comprise hardware and/or software, that are capable of generating new and/or modified data.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With attention now to FIG. 1, details are provided concerning an example architecture and environment, one example of an operating environment for embodiments of the invention is denoted generally at 100. In general, the operating environment 100 may include a production site 102 where normal operations of an entity, such as a business enterprise for example, take place. The production site 102 may include a production system 104 that may comprise elements, such as applications for example, that may operate to generate new and/or modified data 106.

With continued reference to FIG. 1, the production site 102 may communicate, possibly on a selective basis, with a data storage vault 108, or simply 'vault,' by way of an air gap 110. For example, the data 106 may be backed up at the vault 110 when the air gap 110 is closed. The data 106 may be stored in the vault as one or more PITs 112.

Note that as used herein, an 'air gap' embraces a physical isolation, or separation, of a storage vault from any exterior system or device that may be susceptible to attack. That is, when the air gap associated with a vault is open, the air gapped vault is physically detached, and unconnected, from such exterior devices. As such, when the air gap is open, the air gapped vault is not accessible by any form of wireless, or hardwire, including optical, communication system or device. Conversely, when the air gap is closed, the vault, and some or all of its contents, may be accessible by external systems and devices, such as an application host for example, whether by wireless and/or hardwired communication channels.

In some embodiments, the vault 108 may comprise a Dell PowerProtect Cyber Recovery vault, but no particular vault is required. The vault 108 and part, or all, of its contents, may be isolated from the production site 102, and other external entities, when the air gap 110 is open. When the air gap 110 is closed, the vault 108 may be able to communicate with the production site 102 to transfer data, information, and metadata, for example, in either or both directions, between the vault 108 and production site 102, as shown in FIG. 1. In an embodiment, the air gap 110 may be omitted, such that the production site 102 can communicate directly with the vault 108. As further indicated in FIG. 1, an evaluator module 114 may be provided that is able to communicate with the production site 102, and the vault 108 by way of the air gap 110. In general, and as discussed in more detail below, the evaluator module 114 may be operable to analyze one or more of the PITs 112.

Finally, a sandbox 116 may be provided that may include a copy 118 of the production system 114. The sandbox 116 may also include one, some, or all, of the PITs 112, or copies of the PITs. In an embodiment, the evaluator module 114 may retrieve the PITs 112 and provide those to the sandbox 116. In an embodiment, an air gap 120 may be provided between the evaluator module 114 and the sandbox 116. Likewise, an air gap 122 may be provided between the production system 102 and the sandbox 116.

B. Operational Aspects of Some Embodiments

Figure 2:
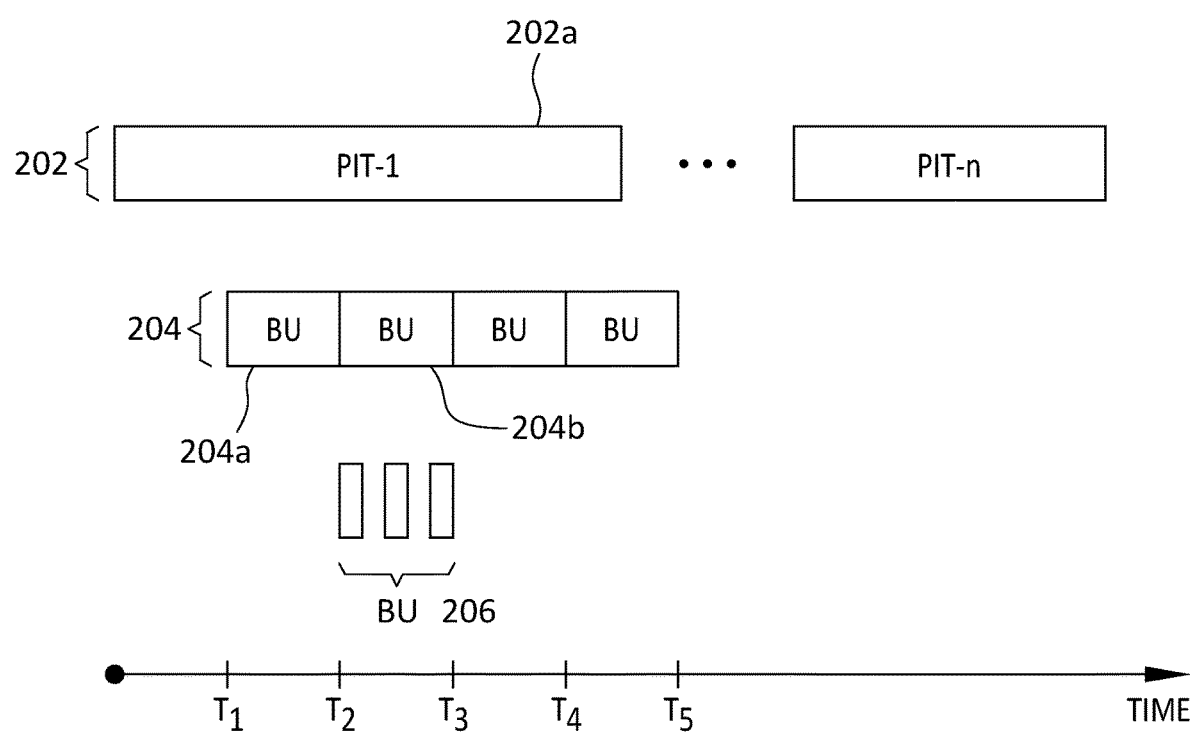
FIG. 2 discloses an example scheme for taking increasingly granular backups.

With reference now to FIG. 2, further details are provided concerning some PITs and related processes. As shown in the example of FIG. 2, various PITs 202 may exist for a dataset, such as a backup dataset for example. As the PITs are generated over time, or on a temporal basis, they can be shown as ordered over time along a timeline.

In an embodiment, a search process, such as a binary search for example, may be used to identify a particular PIT of interest, such as the PIT 202a. In general, the binary search may determine that the PIT 202a includes an element or characteristic that is indicative of a problem, or other event, with the data embraced by that PIT 202a. Typically, however, the search will not indicate when the event first manifested. Thus, further evaluation of the PIT 202a may be needed.

Accordingly, an embodiment may run a production system copy in a sandbox, using the data of the PIT 202a. As the production system copy is running with the data, a series of backups 204 of the data used by the production system copy may be generated. The backups 204 may, or may not, be generated at regular time intervals, such as 1 minute apart for example. Further, the backups 204 may be generated back-to-back, although that is not necessarily required and, in an embodiment, a time gap may exist between the end of one backup 204, that is, T2, and the start of the next backup 204, that is, T3.

After the backups 204 have been generated, each of the backups 204 may be examined to determine if their respective data indicates an event of interest has occurred. For example, if an event is determined to have occurred sometime between the end of backup 204a and the end of backup 204b, then backup 204b may be selected for further analysis.

As further indicated in FIG. 2, an additional set of backups 206 may then be generated for the data of backup 204b. The backups 206 may be generated on a more granular basis, such as 1 second apart, than the basis, 1 minute apart, on which the backups 204 were generated. By applying this approach of successively more granular backups, an embodiment may enable relatively fast, and accurate, determinations of when an event of interest began, as well as the duration of that event. Following is further discussion concerning aspects of some embodiments.

C. Further Aspects of Some Example Embodiments

As mentioned earlier, one or more PITs may be included in a forensics kit, such as a CR forensics kit for example. When a user wants to analyze where and when important events happened, doing so in a naïve way, such as by searching an entire dataset for example, may require a prohibitively large amount of time and resources. Considering that the PITs are ordered by time, it is likewise the case that stages of an infection, which is an example of an 'event' as disclosed herein, are also ordered by time, at least in part. An embodiment may use a binary search over the PIT list to search for, and analyze, events.

Additionally, an embodiment may, as noted in the example of FIG. 2, limit further searches of events based on the results of previous searches of events. For example, if an infected part is identified in the future indicative that an event has happened, first look for this infection when evaluating a past PIT. If the infection is found, stop this scanning and move further in the past and continue trying to find the first point for the event.

Note that, for example, unsanctioned deletion/corruption of files is an event that necessarily occurs post-infection. It is noted further that the evaluation of each PIT in the search may be static or dynamic. That is, the data being used by the running production system copy may be evaluated, and/or the data may be statically fed to the system, such as the evaluator module 114, for evaluation, without necessitating the use of the production system copy.

In more detail, if the data of interest includes the complete state of a system, it also includes processes that are running or will be run, and an embodiment may accordingly let the processes run. Additionally, or if there is only data and not a full state, an embodiment may run analysis scripts on the data to analyze the data for the presence of corrupted data, and indicators of corrupted data. Note that 'running' a copy may be a way to examine the PITs functionally rather than looking at data changes. For example, some corruptions may change very little data but are still destructive functionally.

As this disclosure makes clear, an embodiment may use a binary search to efficiently search PITs for events as part of the infection, and may further use the results of one or more preliminary searches to limit the possible range of search for a subsequent event. Advantageously, such an approach may provide for faster search/analysis of a PIT sequence for events, and for researching the infection, or other event, that has taken place.

D. Example Methods

Figure 3:
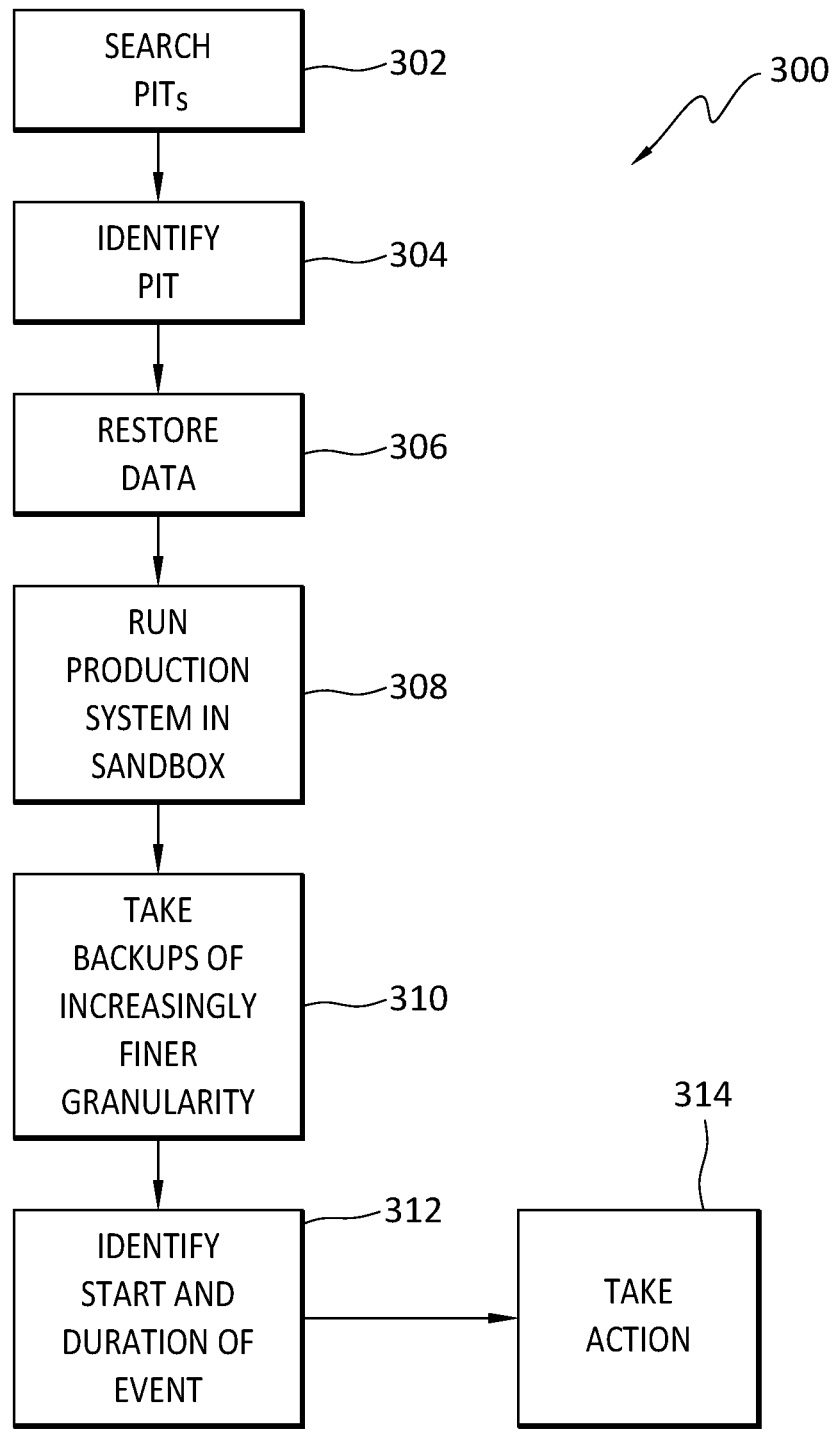
FIG. 3 discloses aspects of an example method according to an embodiment.

It is noted with respect to the disclosed methods, including the example method of FIG. 3, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 3, a method according to one example embodiment is denoted at 300. In general, part, or all, of the method 300 may be performed by an evaluator, such as the evaluator module 114. The evaluator may be a stand-alone entity, or may be hosted, such as at a production site, a sandbox, or a data storage site, such as a vault, for example.

The example method 300 may begin with a search 302, which may or may not be a binary search, of one or more PITs in a list of PITs that concern a dataset. The search 302 may identify 304 a PIT in which an indicator of an event of interest is present.

The data to which the PIT corresponds may then be restored 306, such as to a sandbox for example. A production system copy may then be run 308 in the sandbox, using the restored data.

As the production system copy runs 308 using the restored data, backups of increasingly finer granularity may be taken 310 of the restored data that is being used by the production system copy. In this way, the start and duration of the event of interest may be accurately and precisely determined 312. As well, once these parameters are determined, or at the same time, the nature of the event may also be determined.

Finally, one or more actions may be taken based on the information obtained at 312. Such actions 312 may include, but are not limited to, (1) stopping an ongoing attack, (2) implementing a remedy to an attack that has occurred, and/or, (3) preventing a future attack.

E. Further Example Embodiments

Following are some further example embodiments of the invention. These are presented only by way of example and are not intended to limit the scope of the invention in any way.

Embodiment 1

A method, comprising: searching a group of PITs; identifying one of the PITs as having an indicator of an occurrence of an event involving data associated with the identified PIT; restoring the data; running a production system copy using the data; and while the production system copy is running, taking increasingly granular backups of the data until the event is located.

Embodiment 2

The method as recited in embodiment 1, wherein the production system copy is run in a sandbox.

Embodiment 3

The method as recited in any of embodiments 1-2, wherein the data is obtained from an air gapped storage vault.

Embodiment 4

The method as recited in any of embodiments 1-3, wherein the searching of the PITs comprises performing a binary search.

Embodiment 5

The method as recited in any of embodiments 1-4, wherein taking increasingly granular backups of the data comprises taking a group of backups that comprises backups of respective portions of the data, and then taking a backup of a portion of one of the backups in the group of backups.

Embodiment 6

The method as recited in embodiment 5, wherein the backups in the group of backups are taken consecutively and do not overlap with each other.

Embodiment 7

The method as recited in embodiment 5, wherein the backups in the group of backups are taken back-to-back with each other.

Embodiment 8

The method as recited in any of embodiments 1-7, wherein the event is a corruption of the data.

Embodiment 9

The method as recited in any of embodiments 1-8, wherein after the event is located, an action is taken, and the action comprises one or more of stopping an ongoing attack, implementing a remedy to an attack that has occurred, and/or, preventing a future attack.

Embodiment 10

The method as recited in any of embodiments 1-9, wherein each of the PITs comprises either a snapshot or a backup of a portion of the data.

Embodiment 11

A system, comprising hardware and/or software, operable to perform any of the operations, methods, or processes, or any portion of any of these, disclosed herein.

Embodiment 12

A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
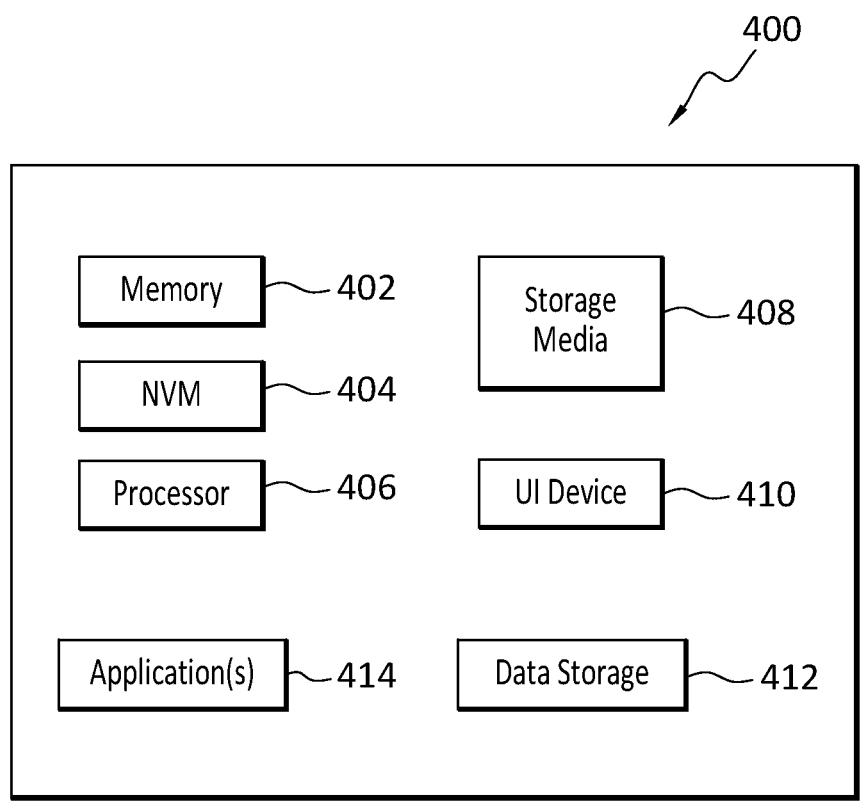
FIG. 4 discloses aspects of an example computing entity operable to perform any of the disclosed methods, processes, and operations.

With reference briefly now to FIG. 4, any one or more of the entities disclosed, or implied, by FIGS. 1-3 and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI (user interface) device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    searching a group of point-in-times (PITs) based on an occurrence of an event;
    identifying one of the PITs as having an indicator of the occurrence of the event involving data associated with the identified PIT;
    recursively restoring and identifying, based on the indicator of the occurrence of the event, second data, which has been saved for a second period, in a sandbox within first data, which has been identified and saved in a previous recursion in the sandbox for a first period longer than the second period;
    identifying a start time and a duration of the event within the second period, during which the second data has been saved; and
    taking an action based on the start time and the duration of the event,
    wherein recursively restoring and identifying data comprises restoring and identifying a group of backups that comprises backups of respective portions of the identified data, and then restoring and identifying a backup of a portion of one of the backups in the group of backups.

2. The method as recited in claim 1, wherein a production system copy is run, in the sandbox, using the identified data, and the analyzing takes place while the production system copy is running.

3. The method as recited in claim 1, wherein the identified data is obtained from an air gapped storage vault.

4. The method as recited in claim 1, wherein the searching of the PITs comprises performing a binary search.

5. The method as recited in claim 1, wherein the backups in the group of backups are taken consecutively and do not overlap with each other.

6. The method as recited in claim 1, wherein the backups in the group of backups are taken back-to-back with each other.

7. The method as recited in claim 1, wherein the event is a corruption of the data.

8. The method as recited in claim 1, wherein the action comprises one or more of stopping an ongoing attack, implementing a remedy to an attack that has occurred, and/or, preventing a future attack.

9. The method as recited in claim 1, wherein each of the PITs comprises either a snapshot or a backup of a portion of the data.

10. A non-transitory storage medium having stored therein instructions that are executable by one or more hardware processors to perform operations comprising:
   searching a group of point-in-times (PITs) based on an occurrence of an event;
   identifying one of the PITs as having an indicator of the occurrence of the event involving data associated with the identified PIT;
   recursively restoring and identifying, based on the indicator of the occurrence of the event, second data, which has been saved for a second period, in a sandbox within first data, which has been identified and saved in a previous recursion in the sandbox for a first period longer than the second period;
   identifying a start time and a duration of the event within the second period, during which the second data has been saved; and
   taking an action based on the start time and the duration of the event,
   wherein recursively restoring and identifying data comprises restoring and identifying a group of backups that comprises backups of respective portions of the identified data, and then restoring and identifying a backup of a portion of one of the backups in the group of backups.

11. The non-transitory storage medium as recited in claim 10, wherein a production system copy is run, in the sandbox, using the data, and the analyzing takes place while the production system copy is running.

12. The non-transitory storage medium as recited in claim 10, wherein the identified data is obtained from an air gapped storage vault.

13. The non-transitory storage medium as recited in claim 10, wherein the searching of the PITs comprises performing a binary search.

14. The non-transitory storage medium as recited in claim 10, wherein the backups in the group of backups are taken consecutively and do not overlap with each other.

15. The non-transitory storage medium as recited in claim 10, wherein the backups in the group of backups are taken back-to-back with each other.

16. The non-transitory storage medium as recited in claim 10, wherein the event is a corruption of the data.

17. The non-transitory storage medium as recited in claim 10, wherein the action comprises one or more of stopping an ongoing attack, implementing a remedy to an attack that has occurred, and/or, preventing a future attack.

18. The non-transitory storage medium as recited in claim 10, wherein each of the PITs comprises either a snapshot or a backup of a portion of the data.

\* \* \* \* \*